(12) United States Patent
Jahangiri-Famenini

(10) Patent No.: US 9,561,964 B2
(45) Date of Patent: Feb. 7, 2017

(54) METHOD AND APPARATUS FOR FORMING GRAPHENE

(71) Applicant: Hamid-Reza Jahangiri-Famenini, Toronto (CA)

(72) Inventor: Hamid-Reza Jahangiri-Famenini, Toronto (CA)

( * ) Notice: Subject to any disclaimer, the term of this patent is extended or adjusted under 35 U.S.C. 154(b) by 97 days.

(21) Appl. No.: 14/641,271

(22) Filed: Mar. 6, 2015

(65) Prior Publication Data

US 2015/0175427 A1 Jun. 25, 2015

Related U.S. Application Data

(63) Continuation-in-part of application No. 14/230,632, filed on Mar. 31, 2014, now Pat. No. 9,005,565, which is a continuation-in-part of application No. 13/134,217, filed on Jun. 2, 2011, now abandoned.

(60) Provisional application No. 61/398,332, filed on Jun. 24, 2010.

(51) Int. Cl.
*C01B 31/04* (2006.01)
*B82Y 30/00* (2011.01)
*B82Y 40/00* (2011.01)

(52) U.S. Cl.
CPC ............ *C01B 31/0446* (2013.01); *B82Y 30/00* (2013.01); *B82Y 40/00* (2013.01); *C01B 31/0484* (2013.01)

(58) Field of Classification Search
CPC .. C01B 31/0446; C01B 31/0484; B82Y 40/00; B82Y 30/00
USPC .......................................................... 423/448
See application file for complete search history.

(56) References Cited

U.S. PATENT DOCUMENTS

2010/0209330 A1* 8/2010 Golzhauser ............ B82Y 30/00
423/448
2014/0234200 A1* 8/2014 Tour .................... C01B 31/0446
423/448

OTHER PUBLICATIONS

Turchanin, et al., Conversion of Self-Asembled Monolayers into Nanocrystalline Graphene: Structure and Electronic Transport, ACS Nano 2011; 5(5): 3896-3904.*
Defintion of monolayer, accessed online at http://www.dictionary.com/browse/monolayer on Aug. 7, 2016.*

* cited by examiner

*Primary Examiner* — Daniel C McCracken

(57) ABSTRACT

A method of forming graphene comprises patterning an organic material monolayer disposed on a first substrate to yield a patterned organic material monolayer, and supplying thermal energy to the patterned organic material monolayer. The thermal energy is sufficient to carbonize the monolayer to form a patterned layer of graphene on said substrate.

31 Claims, 5 Drawing Sheets

METHOD AND APPARATUS FOR FORMING GRAPHENE

CROSS-REFERENCE TO RELATED APPLICATIONS

This application is a continuation-in-part of U.S. application Ser. No. 14/230,632 filed on Mar. 31, 2014, which is a continuation-in-part of U.S. application Ser. No. 13/134,217 filed on Jun. 2, 2011, which claims the benefit of U.S. Application No. 61/398,332 filed on Jun. 24, 2010, the contents of which are incorporated herein by reference in their entireties.

FIELD OF THE INVENTION

The present invention relates generally to thin film fabrication and in particular, to a method and apparatus for forming graphene.

BACKGROUND OF THE INVENTION

First discovered in 2004, graphene is a one-atom-thick planar sheet of sp2-bonded carbon atoms that are densely packed in a honeycomb crystal lattice. In other words, it consists of a two-dimensional, giant, flat molecule made up of a lattice of carbon atoms, arranged in hexagons, which is only the thickness of an atom.

Graphene was initially obtained by mechanical exfoliation of graphite, using "the sticky-tape method" to repeatedly split graphite crystals into increasingly thinner pieces.

Various other methods for producing graphene have been used such as evaporating a mixture of large carbon-containing molecules and firing it over a heated metal surface such as extremely thin pieces of nickel, followed by dissolving away the nickel with chemicals, then "mounting" the carbonized residue (that may contain graphene) on a flexible polymer.

The various methods of producing graphene that have been published to this date have been useful for small scale production and therefore employed for research purposes only, as these methods are cumbersome and/or complicated.

Graphene possesses many unique properties, such as: being transparent, having remarkable mechanical strength, being bendable and foldable while still retaining its properties, and being an excellent conductor of electricity.

Due to its unique electronic properties, graphene may be used to fabricate ultra-fast graphene transistors that operate at GHz or near terahertz frequencies while using less energy compared to the currently available transistors, as well as being able to operate at room temperature.

The high electrical conductivity and high optical transparency of graphene make it a candidate for transparent conducting electrodes, required for such applications as touchscreens, liquid crystal displays, organic photovoltaic cells, and organic light-emitting diodes.

Other areas where graphene may be used include "detection technology", and in the conductive plates of ultracapacitors.

It is therefore an object of the present invention at least to provide a novel apparatus and method for fabricating graphene.

SUMMARY OF THE INVENTION

In one aspect, there is provided a method of forming graphene, comprising: patterning an organic material monolayer disposed on a first substrate to yield a patterned organic material monolayer; and supplying thermal energy to the patterned organic material monolayer, the thermal energy being sufficient to carbonize the monolayer to form a patterned layer of graphene on the substrate.

The thermal energy may be supplied by a hot plate, or by a heating element of any of a furnace, a kiln, and an oven.

The method may further comprise disposing a second substrate onto the patterned organic material monolayer, the patterned organic material monolayer being arranged in a sandwich configuration between the first and second substrates.

The patterning may be carried out by ablation using a localized beam of energy. The localized beam of energy may be any of a laser beam, a maser beam, and an electron beam.

The patterning may be carried out by contacting the organic material monolayer with a stamp having a non-planar surface. The patterning may be carried out by lifting-off portions of the organic material monolayer contacting the stamp. The non-planar surface may be heated or cooled. The non-planar surface may have one or more chemical substances disposed thereon to increase adhesion. The non-planar surface may be heated, and wherein the patterning is carried out by evaporating portions of the organic material monolayer contacting the stamp. The non-planar surface may have one or more chemical substances disposed thereon, and wherein the patterning is carried out by removing portions of the organic material monolayer contacting the one or more chemical substances disposed on the stamp, the removing comprising at least one of: dissolving, etching, destroying, and reacting, the portion of the organic material monolayer.

The organic material monolayer may comprise a dopant, and wherein the supplying comprises forming a patterned layer of doped graphene on the substrate.

In another aspect, there is provided a method of forming graphene, comprising: supplying energy to at least a portion of an organic material monolayer disposed on a substrate, the energy being a localized beam of energy, the energy being sufficient to carbonize the at least a portion of the monolayer exposed thereto to form a layer of graphene on the substrate.

The localized beam of energy may be any of a laser beam, a maser beam, and an electron beam.

The method may further comprise moving the localized beam over the organic material monolayer in accordance with a pattern.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The organic material monolayer may comprise a dopant, and wherein the supplying comprises forming a layer of doped graphene on the substrate.

The method may further comprise one or more of: (i) cooling the substrate during the supplying, and (ii) placing the substrate in an environment having an elevated atmospheric pressure, to reduce evaporation of the organic material monolayer during carbonization. The method may further comprise a combination of cooling the substrate and placing the substrate in the environment having the elevated atmospheric pressure during the supplying.

The method may further comprise, after the supplying, removing an uncarbonized portion of the organic material monolayer.

In another aspect, there is provided a method of forming graphene, comprising: supplying energy to at least a portion of an organic material monolayer disposed on a substrate, the energy being sufficient to carbonize the at least a portion of the monolayer exposed thereto to form a layer of graphene on the substrate; and one or more of: (i) cooling the substrate during the supplying, and (ii) placing the substrate in an environment having an elevated atmospheric pressure, to reduce evaporation of the organic material monolayer during carbonization.

The energy may be a localized beam of energy. The localized beam of energy may be any of a laser beam, a maser beam, and an electron beam.

The method may further comprise moving the localized beam over the organic material monolayer in accordance with a pattern.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The organic material monolayer may be in either a solid state or a liquid state.

The organic material monolayer may further comprise a dopant, and wherein the supplying comprises forming a layer of doped graphene on the substrate.

The method may further comprise a combination of cooling the substrate and placing the substrate in the environment having the elevated atmospheric pressure during the supplying.

The method may further comprise, after the supplying, removing an uncarbonized portion of the organic material monolayer.

In another aspect, there is provided a method of forming graphene, comprising: supplying energy to at least a portion of an organic material monolayer disposed on a substrate, the energy being thermal energy supplied by a hot plate, or by a heating element of any of a furnace, a kiln, and an oven, the energy being sufficient to carbonize the at least a portion of the monolayer exposed thereto to form a layer of graphene on the substrate; and one or more of: (i) cooling the substrate during the supplying, and (ii) placing the substrate in an environment having an elevated atmospheric pressure, to reduce evaporation of the organic material monolayer during carbonization.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The organic material monolayer may comprise a dopant, and wherein the supplying comprises forming a layer of doped graphene on the substrate.

The method may further comprise a combination of cooling the substrate and placing the substrate in the environment having the elevated atmospheric pressure during the supplying.

The method may further comprise, after the supplying, removing an uncarbonized portion of the organic material monolayer.

In another aspect, there is provided a method of fabricating a patterned organic material monolayer, comprising: patterning an organic material monolayer disposed on a first substrate to yield a patterned organic material monolayer, the patterning being carried out by exposing a portion of the organic material monolayer to a localized beam of energy, the energy being sufficient to evaporate or ablate the exposed portion of the organic material monolayer.

The method may further comprise one or more of: (i) cooling the substrate during the patterning, and (ii) placing the substrate in an environment having an elevated atmospheric pressure during the patterning, to reduce evaporation of an unexposed portion of the organic material monolayer during the patterning. The method may further comprise a combination of cooling the substrate and placing the substrate in the environment having the elevated atmospheric pressure during the patterning.

The localized beam of energy may be any of a laser beam, a maser beam, and an electron beam.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The organic material monolayer may comprise a dopant, and wherein the patterning comprises forming a doped patterned organic material monolayer on the substrate.

The method may further comprise moving the localized beam over the organic material monolayer in accordance with a pattern.

The method may further comprise supplying additional energy to the patterned organic material monolayer, the additional energy being sufficient to carbonize the monolayer to form a patterned layer of graphene on the substrate.

In another aspect, there is provided a method of reducing evaporation of an organic material monolayer disposed on a substrate during carbonization thereof to form graphene, the method comprising: one or more of: (i) cooling the substrate during supplying of energy to at least a portion of the organic material monolayer; and (ii) placing the substrate in an environment having an elevated atmospheric pressure during supplying of energy to at least a portion of the organic material monolayer, to reduce evaporation of the organic material monolayer during carbonization, wherein the energy is sufficient to carbonize the at least a portion of the monolayer exposed thereto to form a layer of graphene on the substrate.

The energy may be a localized beam of energy. The localized beam of energy may be any of a laser beam, a maser beam, and an electron beam.

The method may further comprise moving the localized beam over the organic material monolayer in accordance with a pattern.

The substrate may comprise a plate. The plate may comprise a planar surface. The plate may comprise a surface having a non-planar topography formed by one or more of etching and deposition. The plate may comprise at least one internal conduit for conducting fluid therethrough for any of heating and cooling the plate. The plate may have a surface coating for modifying surface properties of the substrate, the organic material monolayer being disposed on the surface coating.

The organic material monolayer may be in either a solid state or a liquid state.

The organic material monolayer may further comprise a dopant, and wherein the supplying comprises forming a layer of doped graphene on the substrate.

The method may further comprise a combination of cooling the substrate and placing the substrate in the environment having the elevated atmospheric pressure during the supplying.

The method may further comprise, after the supplying, removing an uncarbonized portion of the organic material monolayer.

BRIEF DESCRIPTION OF THE DRAWINGS

Embodiments will now be described more fully with reference to the accompanying drawings in which.

DETAILED DESCRIPTION OF THE EMBODIMENTS

Figure 1:
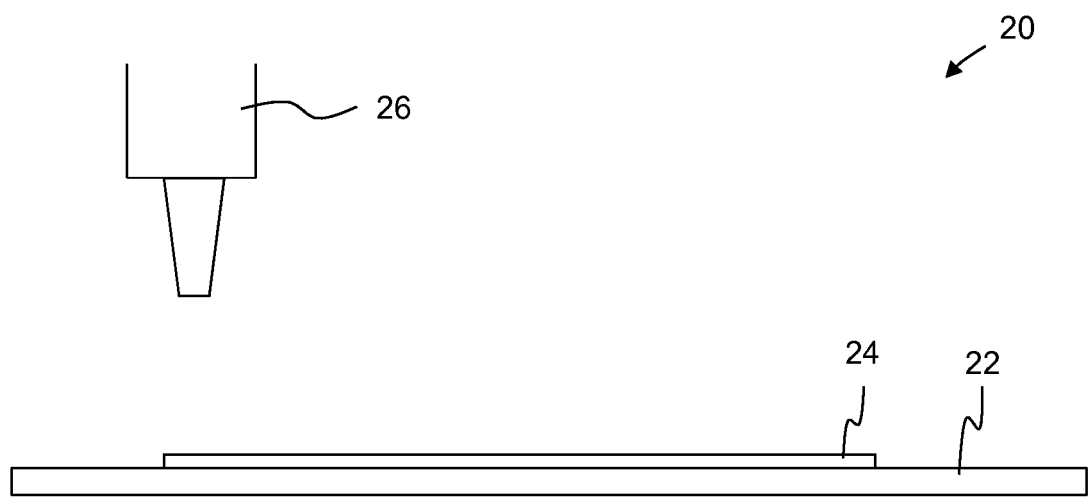
FIG. 1 is a schematic side view of an apparatus for forming a patterned organic material monolayer.
Figure 2:
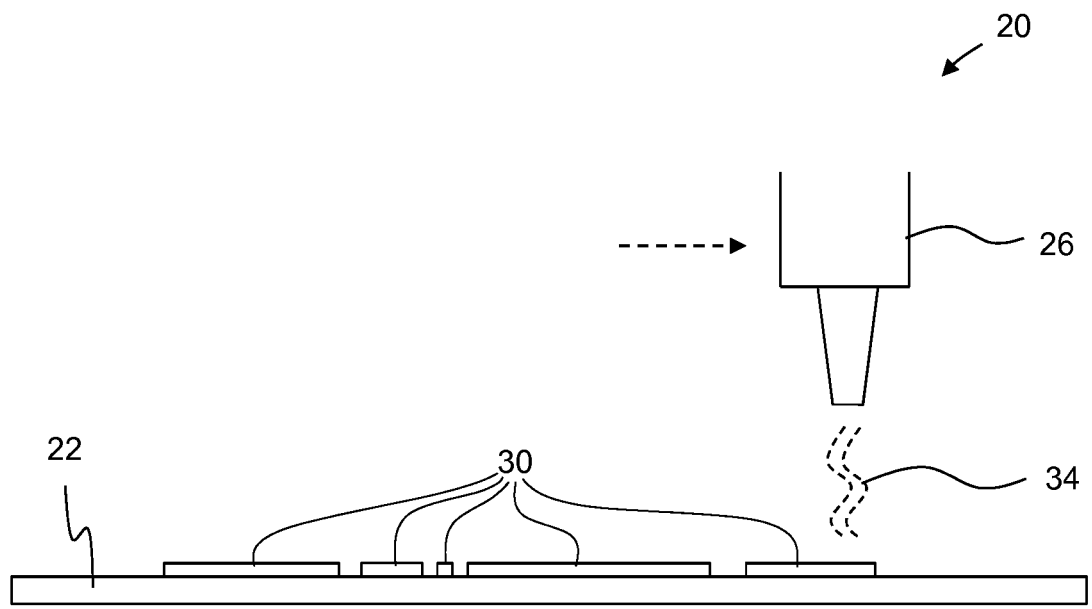
FIG. 2 is a schematic side view of the apparatus for forming a patterned organic material monolayer of FIG. 1, during use.

Turning now to FIGS. 1 and 2, an apparatus for forming a patterned organic material monolayer is shown, and is generally indicated by reference numeral 20. Apparatus 20 comprises a suitable support (not shown) for a first substrate 22 on which an organic material monolayer 24 is disposed. In this embodiment, the substrate 22 has a generally planar shape and is in the form of a thin metal foil or other suitable material.

The apparatus 20 further comprises an energy source 26 that is configured to supply sufficient energy to the organic material monolayer 24 for removing at least a portion of the organic material monolayer 24 according to a predefined pattern, so as to form a patterned organic material monolayer 30. In this embodiment, the predefined pattern is a negative image of a circuit pattern.

In this embodiment shown, the energy source 26 is configured to provide localized energy in the form of an energy beam 34. The energy beam 34 is spatially localized, such that at any given time the energy beam 34 only exposes an area or "spot" having a diameter that is generally commensurate with the width of the energy beam 34. Accordingly, only the portion of the organic material monolayer 24 that is directly exposed to the energy beam 34 is removed, while surrounding portions of the organic material monolayer 24 that are not exposed, or have not yet been exposed, are not removed. In this embodiment, the energy source 26 is a laser, the energy beam 34 is a laser beam, and removal of the portion of the organic material monolayer 24 involves laser ablation of the organic material of the monolayer.

The energy source 26 is coupled to a movement controller (not shown) that is in communication with a general purpose computing device (not shown). The general purpose computing device is configured to operate the movement controller according to a program stored in memory thereof, so as to scan the energy beam 34 over the organic material monolayer 24 to form the patterned organic material monolayer 30. The stored program comprises the predefined pattern and, due to the localized nature of the energy beam 34, movement of the energy beam 34 over the organic material monolayer 24 in accordance with the program forms the patterned organic material monolayer 30 having a pattern corresponding with the predefined pattern.

Figure 3:
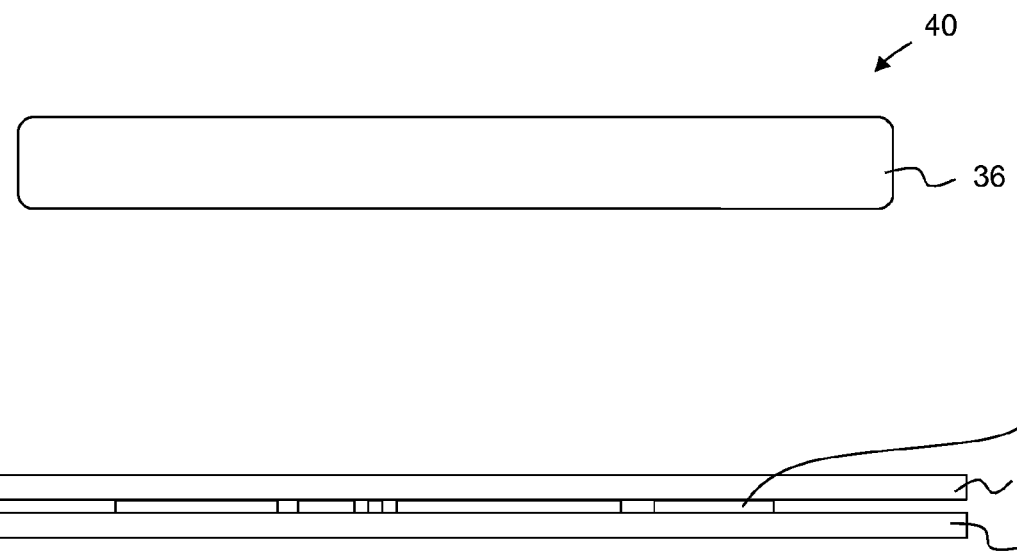
FIG. 3 is a schematic side view of an apparatus for forming graphene.
Figure 4:
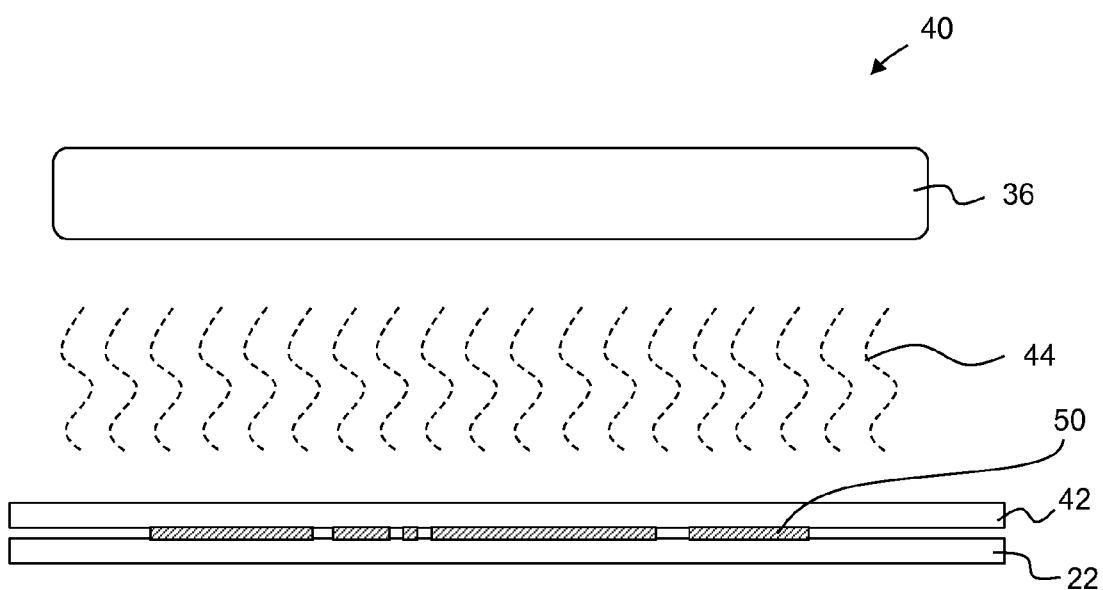
FIG. 4 is a schematic side view of the apparatus for forming graphene of FIG. 3, during use.

FIGS. 3 and 4 show an apparatus for forming patterned graphene, which is generally indicated by reference numeral 40. Once the patterned organic material monolayer 30 has been formed, a second substrate 42 is brought into intimate contact with the patterned organic material monolayer 30 and the first substrate 22, such that the patterned organic material monolayer 30 is disposed between the first substrate 22 and the second substrate 42 in a sandwich configuration. Similar to the first substrate 22, the second substrate 42 has a generally planar shape and is in the form of a thin metal foil or other suitable material.

The apparatus 40 comprises an energy source 36 that is configured to supply thermal energy 44 to the substrates 22 and 42, so as to cause the substrates 22 and 42 to be heated. In turn, the heated substrates 22 and 42 supply sufficient thermal energy to the patterned organic material monolayer 30 by conduction, so as to carbonize the patterned organic material monolayer 30 so as to form a patterned graphene layer 50. Here, it will be understood that carbonizing refers to conversion of the exposed organic material within the patterned organic material monolayer 30 into a patterned monolayer of solid carbon, and specifically a patterned monolayer of graphene, by pyrolysis upon exposure to the supplied energy. As will be understood, in this embodiment, carbonization of the patterned organic material monolayer 30 results from exposure through contact with hot surfaces, and namely the surfaces of the heated substrates 22 and 42. In this embodiment, the energy source 36 is a heating element of a heated chamber, such as for example an oven, a furnace, or a kiln, etc.

During use, the organic material monolayer 24 disposed on the first substrate 22 is patterned using the apparatus 20. Upon execution of the program, the general purpose computing device operates the movement controller to position the energy beam 34 spot at a starting point within the organic material monolayer 24, and then scans the energy beam 34 spot over the organic material monolayer 24 to remove organic material in accordance with the predefined pattern. Once the program has been executed, the organic material remaining on the first substrate 22 is the patterned organic material monolayer 30. The second substrate 42 is then brought into intimate contact with the first substrate 22 and the patterned organic material monolayer 30. The first and second substrates 22 and 42, with the patterned organic material monolayer 30 disposed therebetween, are brought into proximity with the energy source 36 of the apparatus 40. Thermal energy 44 supplied by the energy source 36 to the substrates 22 and 42 causes the substrates 22 and 42 to be heated. In turn, the heated substrates 22 and 42 supply sufficient thermal energy to at least a portion of the patterned organic material monolayer 30 by conduction, so as to carbonize the patterned organic material monolayer 30 so as to form the patterned graphene layer 50.

Figure 5:
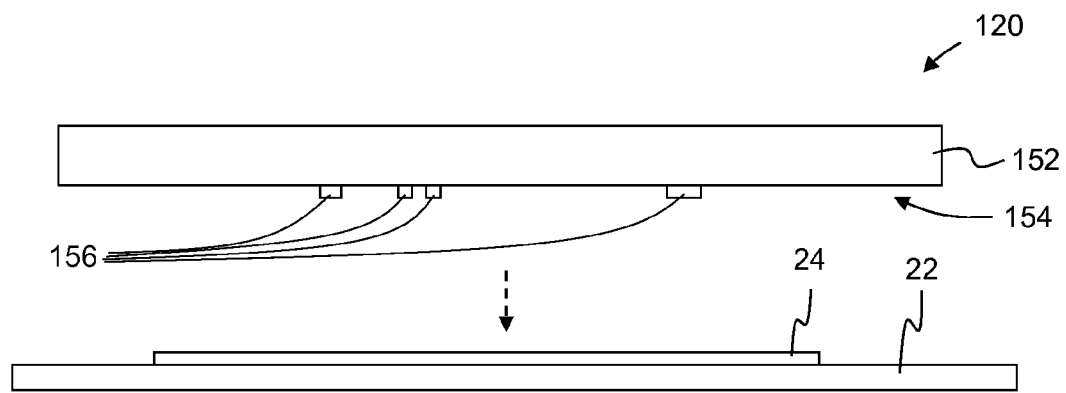
FIG. 5 is a schematic side view of another embodiment of an apparatus for forming a patterned organic material monolayer.
Figure 6:
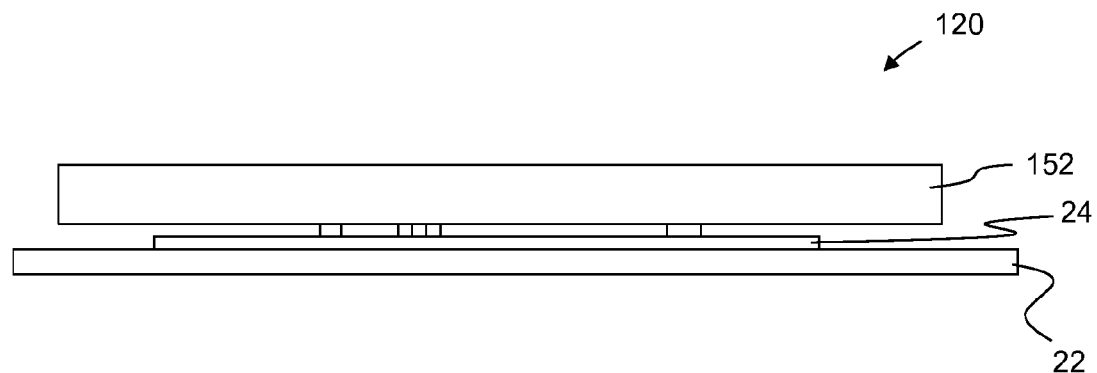
FIGS. 6 and 7 are schematic side views of the apparatus for forming a patterned organic material monolayer of FIG. 5, during use.
Figure 7:
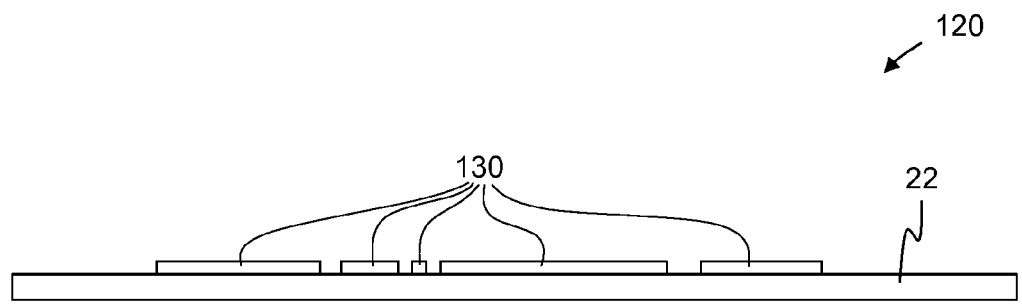

The apparatus for forming the patterned organic material monolayer is not limited to that described above, and in other embodiments, other apparatuses may alternatively be used. For example, FIGS. 5 to 7 show another embodiment of an apparatus for forming a patterned organic material monolayer, which is generally indicated by reference numeral 120. Patterning apparatus 120 comprises a suitable support (not shown) for the first substrate 22 on which the organic material monolayer 24 is disposed.

The patterning apparatus 120 further comprises a stamp 152 comprising a non-planar surface 154 having a surface topography shaped in accordance with a pattern. In this embodiment, the pattern is a negative image of a circuit pattern. The stamp 152 is configured to pattern the organic material monolayer 24 disposed on the first substrate 22 when brought into contact therewith. In particular, when the non-planar surface 154 is brought into intimate contact with the organic material monolayer 24, raised portions 156 of the non-planar surface 154 contact the organic material monolayer 24, as shown in FIG. 6. In this embodiment, the non-planar surface 154 of the stamp is cooled, and more specifically the non-planar surface 154 is maintained at a suitably low temperature so as to not induce evaporation of the organic material when the stamp is brought into intimate contact therewith. In this embodiment, the stamp 152 comprises an internal conduit (not shown) through which cooling fluid is continuously flowed to cool the non-planar surface 154, however in other embodiments, other measures may be used to cool, at least, the non-planar surface 154, such as by exposing the non-planar surface 154 to an externally-applied cold fluid.

During contact, and as a result of the cooling of the non-planar surface 154, portions of the organic material monolayer 24 in contact with the raised portions 156 adhere to the stamp 152. Upon subsequent disengagement of the stamp 152 from the organic material monolayer 24, the portions of the organic material monolayer 24 that are adhered to the raised portions 156 are removed or "lifted off" from the first substrate 22, while surrounding portions of the organic material monolayer 24 that were not in contact with the raised portions 156 are not removed. The partial removal of the organic material monolayer 24 results in a patterned organic material monolayer 130 being formed on the substrate 22.

Although in the embodiment described above, the non-planar surface of the stamp is cooled, and more specifically the non-planar surface is maintained at a suitably low temperature so as to not induce evaporation of the organic material when the stamp is brought into intimate contact therewith, in other embodiments, the non-planar surface of the stamp may alternatively be heated, and such that the heated non-planar surface is maintained at a suitably low temperature so as to not induce evaporation of the organic material when the stamp is brought into intimate contact therewith. In still other embodiments, the non-planar surface of the stamp may alternatively have one or more chemical substances disposed thereon for improving adhesion of the organic material monolayer to the stamp. As will be understood, the one or more chemical substances would modify the surface properties of the non-planar surface of the stamp contacting the organic material monolayer. The one or more chemical substances may be permanently or semi-permanently disposed on the non-planar surface of the stamp, impregnated into the stamp, or may alternatively be disposed on the non-planar surface of the stamp immediately prior to being brought into contact with the organic material monolayer.

Although in the embodiment described above, the non-planar surface of the stamp is cooled, in other embodiments, the non-planar surface of the stamp may alternatively be heated so as to deliberately induce evaporation of the organic material when the stamp is brought into intimate contact therewith. For example, in one such embodiment, the non-planar surface of the stamp may be maintained at a suitably high temperature so as to induce evaporation of the organic material when the stamp is brought into intimate contact therewith. In this embodiment, the stamp comprises an internal conduit (not shown) through which heated fluid is continuously flowed for heating the non-planar surface, however in other embodiments, other measures may be used to heat, at least, the non-planar surface, such as by exposing the non-planar surface to a heat source. In this embodiment, during contact, and as a result of the heating of the non-planar surface, portions of the organic material monolayer in contact with the raised portions are heated and evaporated, and are thereby removed, while surrounding portions of the organic material monolayer that are not in contact with the raised portions are not removed. The partial removal of the organic material monolayer results in the patterned organic material monolayer being formed on the substrate.

Although in the embodiment described above, the portions of the organic material monolayer adhered to the raised portions are removed or "lifted off" from the first substrate, in other embodiments, the non-planar surface of the stamp may alternatively have one or more chemical substances disposed thereon, and whereby patterning is carried out by removing portions of the organic material monolayer contacting the one or more chemical substances. The one or more chemical substances may be one or more of a solvent, an acid, a base, and the like. The removing may be one or more of dissolution, etching, reacting, destroying, and the like.

Although in the embodiment described above, the energy source is a heating element, in other embodiments, the energy source may alternatively be another suitable source of thermal energy, such as for example a flame.

Although in the embodiment described above, the energy source is configured to supply thermal energy to the substrates, in other embodiments, another energy source may alternatively be used. For example, in one embodiment, the energy source may alternatively comprise a heated surface, and may be configured to be brought into contact with either the first substrate or the second substrate, so as to cause the contacted substrate to be heated via the heated surface. In one such embodiment, the energy source may be a hot plate, for example. In a related embodiment, the apparatus may alternatively comprise two energy sources, with each energy source having a heated surface, and with each energy source being configured to be brought into contact with a respective one of the first substrate and the second substrate, and simultaneously with the other energy source, so as to simultaneously cause each contacted substrate to be heated via the heated surfaces.

Although in the embodiments described above, the pattern is a negative image of a circuit pattern, in other embodiments, other patterns may alternatively be used. It will also be understood that the "pattern" does not necessitate a repeated and/or regular two-dimensional design, but rather "pattern" merely refers to any desired two-dimensional arrangement. The pattern may for example be a negative electronic circuit pattern, to form a layer of graphene as part of an electronic circuit.

Figure 8:
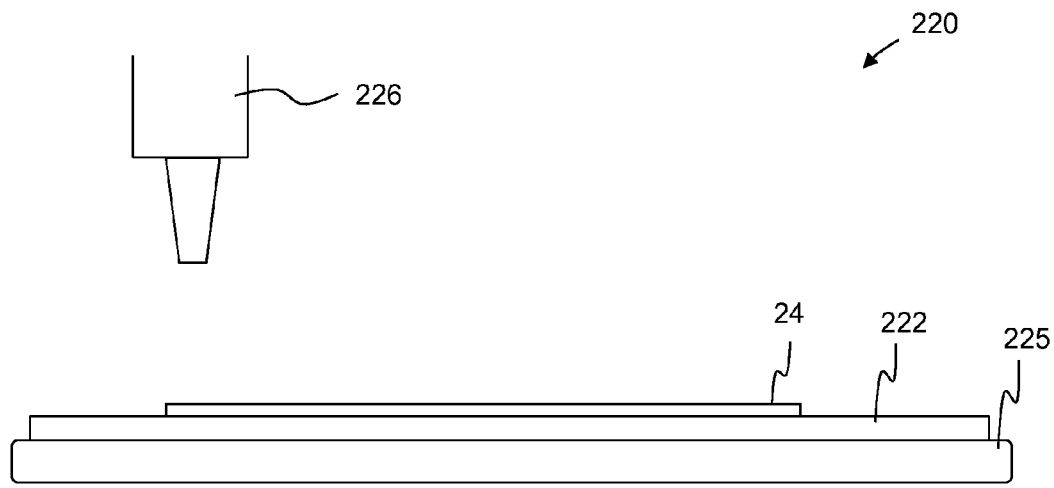
FIG. 8 is a schematic side view of a portion of another embodiment of an apparatus for forming graphene.
Figure 9:
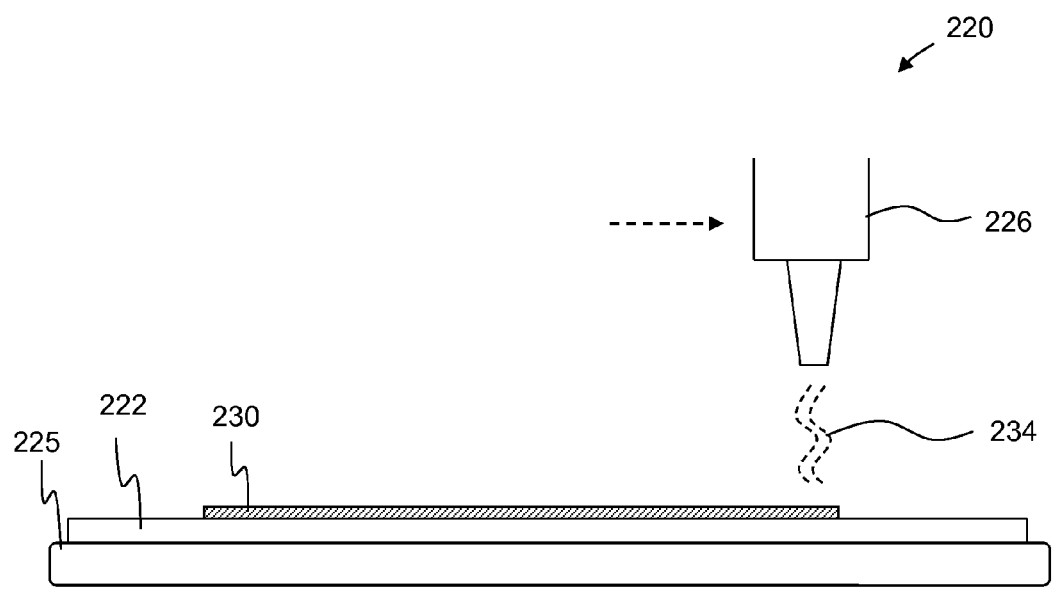
FIG. 9 is a schematic side view of the portion of the apparatus of FIG. 8, during use.

Still other configurations are possible. For example, FIGS. 8 and 9 show a portion of another embodiment of an apparatus for forming graphene, which is generally indicated by reference numeral 220. Apparatus 220 comprises a substrate 222 on which an organic material monolayer 24 is disposed. In this embodiment, the substrate 222 has a generally planar shape, and is in the form of a plate. The apparatus 220 also comprises a chilled support 225 on which the substrate 222 is supported. The chilled support 225 is configured to cool the substrate 222, and the organic material monolayer 24 disposed thereon, during use. In particular, the chilled support 225 is configured to maintain the organic material monolayer 24 at a suitably low temperature so as to prevent evaporation of the organic material during use. In this embodiment, the chilled support 225 is a cooling plate, such as for example a thermoelectric cooling plate.

The apparatus 220 further comprises an energy source 226 that is configured to supply sufficient energy to the organic material monolayer 24 for carbonizing at least a portion of the organic material monolayer so as to form a graphene layer 230. Here, it will be understood that carbonizing refers to conversion of the exposed organic material within the organic material monolayer 24 into a monolayer of solid carbon, and specifically a monolayer of graphene, by pyrolysis upon exposure to the supplied energy.

In the embodiment shown, the energy source 226 is configured to provide localized energy in the form of an energy beam 234. The energy beam 234 is spatially localized, such that at any given time the energy beam 234 only exposes an area or "spot" having a diameter that is generally commensurate with the width of the energy beam 234. Accordingly, only the portion of the organic material monolayer 24 that is directly exposed to the energy beam 234 is carbonized, while surrounding portions of the organic material monolayer 224 that are not exposed, or have not yet been exposed, are not carbonized. In this embodiment, the energy source 226 is a laser, and the energy beam 234 is a laser beam.

The energy source 226 is coupled to a movement controller (not shown) that is in communication with a general purpose computing device (not shown). The general purpose computing device is configured to operate the movement controller according to a program stored in memory thereof, so as to scan the energy beam 234 over the organic material monolayer 24 to form the graphene layer. The stored program comprises a pattern and, due to the localized nature of the energy beam 234, movement of the energy beam 234 over the organic material monolayer 24 in accordance with the program forms a graphene layer having a pattern corresponding with the pattern of the stored program. In the example shown, the pattern covers the entire area of the organic material monolayer 24, such that the entirety of the organic material monolayer 24 is carbonized to form the graphene layer 230 during execution of the program.

During use, the organic material monolayer 24 is disposed on the substrate 222. In this embodiment, the organic material monolayer 24 is disposed on the substrate 222 in a generally arbitrary shape, and the pattern is a rectangular pattern. Upon execution of the program, the general purpose computing device operates the movement controller to position the energy beam 234 spot at a point within the organic material monolayer 24 so as to define a first corner, and to scan the energy beam 234 spot along a first straight line toward a point defining a second corner, thereby carbonizing the organic material present along the first straight line. Upon reaching the second corner, the general purpose computing device operates the movement controller to scan the energy beam 234 spot by a distance equal to about the width of the energy beam 234 along an inward direction from the first side of the organic material monolayer 24, and to scan the energy beam 234 spot along a second straight line parallel to the first straight line and such that a portion of the second straight line overlaps the first straight line, thereby carbonizing the organic material present on the second straight line. The general purpose computing device continues to operate the controller to scan the energy beam 234 spot in a similar manner over the remainder of the organic material monolayer 24, so as to carbonize the organic material present in the remainder of the organic material monolayer 24.

Advantageously, by cooling the substrate 222 and the organic material monolayer disposed thereon using the chilled support 225, evaporation of the organic material monolayer 24 during exposure to the energy beam 234 is reduced or eliminated.

It will be understood that other patterns may be used. For example, although in the embodiment described above, the general purpose computing device operates the movement controller to scan the energy beam spot from the second corner along a second straight line parallel to the first straight line and such that a portion of the second straight line overlaps the first straight line, in other embodiments, the general purpose computing device may alternatively operate the movement controller to scan the energy beam spot along a second straight line from the second corner toward a point defining a third corner, and in turn to a point defining a fourth corner, and then to a point adjacent the first corner, and so forth, so as to operate the movement controller to scan the energy beam spot in a continuously decreasing periphery, such that the energy beam spot is moved "inwardly" with respect to the pattern until the entirety of the organic material monolayer is carbonized to form the graphene layer. In another embodiment, the general purpose computing device may alternatively operate the movement controller to scan the energy beam spot beginning at the center of the organic material monolayer, or at another point within the organic material monolayer, and moving "outwardly" with respect to the pattern, until the entirety of the organic material monolayer is carbonized to form the graphene layer. It will also be understood that the pattern need not be limited to a rectangular pattern and in other embodiments, the pattern may alternatively be of another shape, such as for example a square, circle, oval, and the like, or any other regular polygon, or an irregular shape.

Although in the embodiment described above, the pattern covers the entire area of the organic material monolayer, such that the entirety of the organic material monolayer is carbonized to form the graphene layer during execution of the program, in other embodiments, the pattern may alternatively not cover the entire area of the organic material monolayer. For example, the pattern may alternatively cover only a portion of the organic material monolayer, such that only the portion of the organic material monolayer exposed to the energy beam within the pattern is carbonized to form the graphene layer upon execution of the pattern. In one such embodiment, the unexposed organic material monolayer, and namely the portion of the organic material monolayer not exposed to the energy beam, may be selectively removed subsequent to exposure to the energy beam, such that only the carbonized layer remains on the substrate. The unexposed organic material monolayer may be selectively removed by any of, for example, dissolution by solvent, etching, and the like. In such embodiments, the pattern may for example be an electronic circuit pattern for forming a layer of graphene as part of an electronic circuit.

Although in the embodiment described above, the apparatus comprises a substrate configured to be cooled for reducing or eliminating evaporation of the organic material monolayer during exposure to the energy beam, in other embodiments, other configurations may alternatively be used for reducing or eliminating evaporation. For example, in one embodiment, the apparatus may alternatively be placed in a cooled environment, such as for example in a refrigerator or in a refrigerated chamber, so as to cool the organic material monolayer to reduce or eliminate evaporation. In another embodiment, a cooled fluid, such as for example liquid nitrogen, may alternatively be delivered to the organic material monolayer at and/or near the energy beam spot during exposure (e.g. via a suitably positioned conduit or tube), so as to reduce or eliminate evaporation. As will be understood, liquid nitrogen is advantageous as a cooling fluid as it would not be converted into graphene during carbonization. In another embodiment, the substrate having the organic material monolayer disposed thereon may alternatively be immersed in a volume of liquid nitrogen, so as to cool the organic material monolayer to reduce or eliminate evaporation. In still another embodiment, the apparatus may alternatively be placed in an environment having an elevated atmospheric pressure, such as for example in a suitably configured pressure vessel, so as to reduce or eliminate evaporation of the organic material monolayer during exposure to the energy beam. It will be understood that, in still other embodiments, a combination of cooling and elevated atmospheric pressure may alternatively be used to reduce or eliminate evaporation of the organic material monolayer during exposure to the energy beam. For example, any of the substrate configured to be cooled, the placement of the apparatus in a cooled environment, the delivery of cooled fluid, and the immersion of the substrate in a volume of liquid nitrogen, all of which are described above, may alternatively be used in combination with placement of the apparatus in an environment having an elevated pressure. Furthermore, the approaches described herein reducing or eliminating evaporation of the organic material monolayer during exposure to the energy beam may be used for reducing or eliminating evaporation of the organic material monolayer during patterning, such as for example by patterning using a localized beam of energy.

Although in the embodiment described above, the energy source is configured to provide localized energy in the form of an energy beam, in other embodiments, other energy sources may alternatively be used. For example, in another embodiment, the energy source may alternatively be a hot surface, such as for example a hot plate, that is configured to be brought into contact with the organic material monolayer and to supply sufficient energy to the organic material monolayer for carbonizing at least a portion of the organic material monolayer so as to form the graphene layer.

Figure 10:
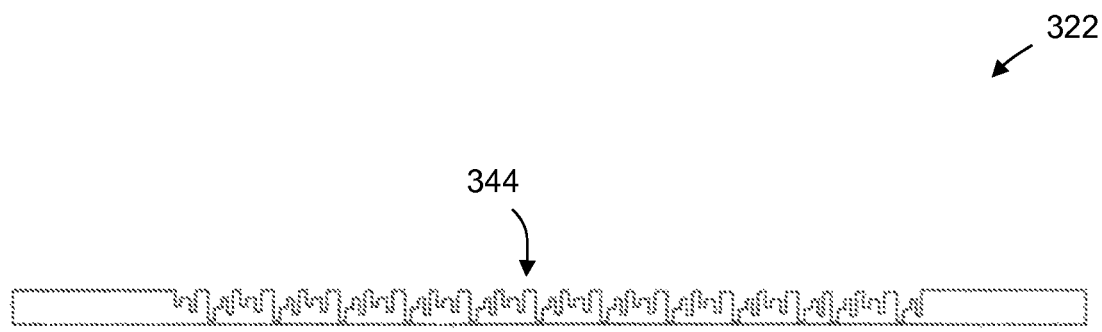
FIG. 10 is a sectional side view of another embodiment of a substrate for use with the apparatus of FIG. 8.

Other substrates may alternatively be used. For example, FIG. 10 shows another embodiment of a substrate for use with the apparatus 220 described above, and which is generally indicated by reference numeral 322. Substrate 322 has a generally planar shape, and comprises a non-planar surface 344 having a surface topography. In this embodiment, the surface topography is formed by deposition of a material, and by subsequent etching of the deposited material. As will be understood, during use, the organic material monolayer (not shown) generally conforms to the surface topography of the non-planar surface 344 when it is disposed thereon, and carbonization of the organic material monolayer results in the formation of a graphene layer on the non-planar surface 344.

Figure 11:
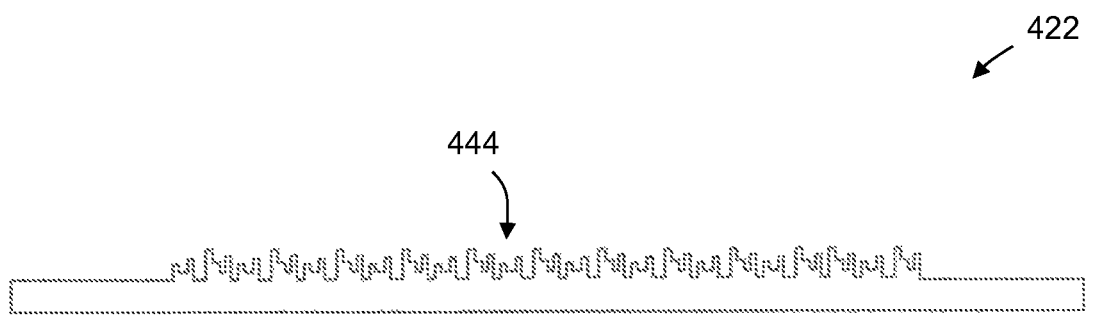
FIG. 11 is a sectional side view of still another embodiment of a substrate for use with the apparatus of FIG. 8.

Still other substrates may alternatively be used. For example, FIG. 11 shows another embodiment of a substrate for use with the 220 apparatus described above, and which is generally indicated by reference numeral 422. Substrate 422 has a generally planar shape, and comprises a non-planar surface 444 having a surface topography. In this embodiment, the surface topography is formed by etching of the substrate material. As will be understood, during use, the organic material monolayer (not shown) generally conforms to the surface topography of the non-planar surface 444 when it is disposed thereon, and carbonization of the organic material monolayer results in the formation of a graphene layer on the non-planar surface 444.

Figure 12:
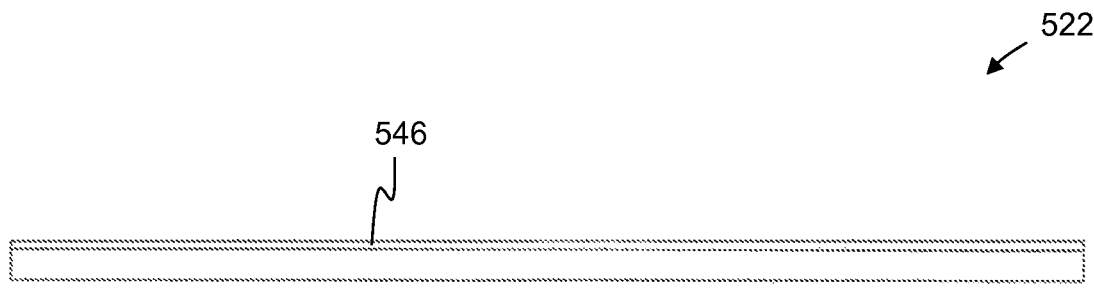
FIG. 12 is a sectional side view of still another embodiment of a substrate for use with the apparatus of FIG. 8.

Still other substrates may alternatively be used. For example, FIG. 12 shows another embodiment of a substrate for use with the apparatus 220 described above, and which is generally indicated by reference numeral 522. Substrate 522 has a generally planar shape, and further comprises a surface coating 546 fabricated of a second material, where the second material is a different material from the substrate material. As will be understood, the surface coating 546 allows the surface properties of the substrate to be modified. During use, the organic material monolayer (not shown) generally is disposed on the surface coating 546, and is exposed to the energy beam for carbonizing at least a portion of the organic material monolayer so as to form a layer of graphene thereon. Depending on the second material used, the modified surface properties provided by the surface coating 546 may, for example, allow the organic material monolayer and/or the layer of graphene (not shown) to better adhere to the substrate, or may for example allow the layer of graphene to be more easily removed from the substrate.

Although embodiments have been described above with reference to the accompanying drawings, those of skill in the art will appreciate that variations and modifications may be made without departing from the scope thereof as defined by the appended claims.

What is claimed is:

1. A method of forming graphene, comprising:
   patterning an organic material monolayer disposed on a first substrate to yield a patterned organic material monolayer; and
   supplying thermal energy to said patterned organic material monolayer, said thermal energy being sufficient to carbonize said monolayer to form a patterned layer of graphene on said substrate,
   wherein said patterning is carried out by contacting the organic material monolayer with a stamp having a non-planar surface.

2. The method of claim 1, wherein said thermal energy is supplied by a hot plate, or by a heating element of any of a furnace, a kiln, and an oven.

3. The method of claim 1, further comprising disposing a second substrate onto said patterned organic material monolayer, said patterned organic material monolayer being arranged in a sandwich configuration between said first and second substrates.

4. The method of claim 1, wherein said patterning is carried out by lifting-off portions of the organic material monolayer contacting said stamp.

5. The method of claim 4, wherein the non-planar surface is heated or cooled.

6. The method of claim 4, wherein the non-planar surface has one or more chemical substances disposed thereon to increase adhesion.

7. The method of claim 1, wherein the non-planar surface is heated, and wherein said patterning is carried out by evaporating portions of the organic material monolayer contacting said stamp.

8. The method of claim 1, wherein the non-planar surface has one or more chemical substances disposed thereon, and wherein said patterning is carried out by removing a portion of the organic material monolayer contacting said one or more chemical substances disposed on said stamp, the removing comprising at least one of: dissolving, etching, destroying, and reacting, the portion of the organic material monolayer.

9. The method of claim 1, wherein said organic material monolayer comprises a dopant, and wherein said supplying comprises forming a patterned layer of doped graphene on said substrate.

10. A method of reducing evaporation of an organic material monolayer disposed on a substrate during carbonization thereof to form graphene, the method comprising:
one or more of:
(i) cooling said substrate during supplying of energy to at least a portion of the organic material monolayer; and
(ii) placing said substrate in an environment having an elevated atmospheric pressure during supplying of energy to at least a portion of the organic material monolayer,
to reduce evaporation of said organic material monolayer during carbonization, wherein said energy is sufficient to carbonize the at least a portion of said monolayer exposed thereto to form a layer of graphene on said substrate.

11. A method of forming graphene, comprising:
supplying energy to at least a portion of an organic material monolayer disposed on a substrate, said energy being thermal energy supplied by a hot plate, or by a heating element of any of a furnace, a kiln, and an oven, said energy being sufficient to carbonize the at least a portion of said monolayer exposed thereto to form a layer of graphene on said substrate; and
one or more of:
(i) cooling said substrate during said supplying, and
(ii) placing said substrate in an environment having an elevated atmospheric pressure,
to reduce evaporation of said organic material monolayer during carbonization.

12. The method of claim 11, wherein said substrate comprises a plate.

13. The method of claim 12, wherein said plate comprises a planar surface.

14. The method of claim 12, wherein said plate comprises a surface having a non-planar topography formed by one or more of etching and deposition.

15. The method of claim 12, wherein said plate comprises at least one internal conduit for conducting fluid therethrough for any of heating and cooling said plate.

16. The method of claim 12, wherein said plate has a surface coating for modifying surface properties of said substrate, said organic material monolayer being disposed on said surface coating.

17. The method of claim 11, wherein said organic material monolayer further comprises a dopant, and wherein said supplying comprises forming a layer of doped graphene on said substrate.

18. The method of claim 11, further comprising a combination of cooling said substrate and placing said substrate in said environment having said elevated atmospheric pressure during said supplying.

19. The method of claim 11, further comprising, after said supplying, removing an uncarbonized portion of said organic material monolayer.

20. A method of fabricating a patterned organic material monolayer, comprising:
patterning an organic material monolayer disposed on a first substrate to yield a patterned organic material monolayer, said patterning being carried out by exposing a portion of the organic material monolayer to a localized beam of energy, said energy being sufficient to evaporate or ablate the exposed portion of the organic material monolayer.

21. The method of claim 20, further comprising one or more of:
(i) cooling said substrate during said patterning, and
(ii) placing said substrate in an environment having an elevated atmospheric pressure during said patterning,
to reduce evaporation of an unexposed portion of said organic material monolayer during said patterning.

22. The method of claim 21, further comprising a combination of cooling said substrate and placing said substrate in said environment having said elevated atmospheric pressure during said patterning.

23. The method of claim 20, wherein said localized beam of energy is any of a laser beam, a maser beam, and an electron beam.

24. The method of claim 20, wherein said substrate comprises a plate.

25. The method of claim 24, wherein said plate comprises a planar surface.

26. The method of claim 24, wherein said plate comprises a surface having a non-planar topography formed by one or more of etching and deposition.

27. The method of claim 24, wherein said plate comprises at least one internal conduit for conducting fluid therethrough for any of heating and cooling said plate.

28. The method of claim 24, wherein said plate has a surface coating for modifying surface properties of said substrate, said organic material monolayer being disposed on said surface coating.

29. The method of claim 20, wherein said organic material monolayer comprises a dopant, and wherein said patterning comprises forming a doped patterned organic material monolayer on said substrate.

30. The method of claim 20, further comprising moving said localized beam over said organic material monolayer in accordance with a pattern.

31. The method of claim 20, further comprising supplying additional energy to said patterned organic material monolayer, said additional energy being sufficient to carbonize said monolayer to form a patterned layer of graphene on said substrate.

* * * * *